US 12,013,283 B2
Jun. 18, 2024

United States Patent
Mes et al.

(54) PYRANOMETER

(71) Applicant: OTT HydroMet B.V., Delft (NL)

(72) Inventors: Joop Mes, Pijnacker (NL); Marc Albert Nijs Korevaar, Oegstgeest (NL); Pavel Babal, Delft (NL); Keith Wilson, Rosmalen (NL); Thijs Bergmans, Delft (NL)

(73) Assignee: OTT HydroMet B.V., Delft (NL)

( * ) Notice: Subject to any disclaimer, the term of this patent is extended or adjusted under 35 U.S.C. 154(b) by 224 days.

(21) Appl. No.: 17/561,704

(22) Filed: Dec. 23, 2021

(65) Prior Publication Data

US 2022/0196466 A1    Jun. 23, 2022

(30) Foreign Application Priority Data

Dec. 23, 2020  (EP) ..................... 20216772

(51) Int. Cl.
*G01J 1/02*        (2006.01)
*G01J 1/42*        (2006.01)

(52) U.S. Cl.
CPC ........... *G01J 1/0252* (2013.01); *G01J 1/0271* (2013.01); *G01J 1/42* (2013.01); *G01J 2001/4285* (2013.01)

(58) Field of Classification Search
CPC .......... G01J 1/0252; G01J 1/0271; G01J 1/42; G01J 2001/4285; G01J 1/0474; G01J 2001/4266; G01J 1/0407
See application file for complete search history.

(56) References Cited

U.S. PATENT DOCUMENTS 3,876,880 A † 8/1975 Guicherd
5,331,168 A * 7/1994 Beaubien .................. G01J 1/02
                                                        250/365

(Continued)

FOREIGN PATENT DOCUMENTS

EP      3480570 A1    5/2019
EP      3480571 A1 †  5/2019

(Continued)

OTHER PUBLICATIONS

International Searching Authority, European Patent Office, International Search Report and the Written Opinion, dated Mar. 14, 2022, 13 pages.
Wolfgang Lucht et al, A Comparison of Satellite-Derived Spectral Albedos to Ground-Based Broadband Albedo Measurements Modeled to Satellite Spatial Scale for a Semidesert Landscape ditional approach to providing coarse resolution albedo, (20000101), URL: https://reader.elsevier.com/reader/sd/pii/S0034425700001255?token=E485B6F01E12A9CB22ABBB982633BDACE6D9C93DA7683539CA50215DC514E8EF77B59FB152E3A2315905280BC63141DD, (Oct. 30, 2020), XP055745720 [A] 15 * pp. 88-89; figures 3,5.†

(Continued)

*Primary Examiner* — David P Porta
*Assistant Examiner* — Gisselle M Gutierrez
(74) *Attorney, Agent, or Firm* — Ference & Associates LLC

(57) ABSTRACT

One embodiment provides a pyranometer, including: a dome; a thermopile-based sensor comprising a receiving surface; a diffusor configured to diffuse radiation external to the pyranometer and passing through the dome, toward the receiving surface of thermopile-based sensor; and at least one optical filter arranged in an optical path of the radiation in front of the receiving surface of the thermopile-based sensor so as to modify the spectral composition of the radiation measured by the thermopile-based sensor. Other aspects are described and claimed.

19 Claims, 6 Drawing Sheets

(56) References Cited

U.S. PATENT DOCUMENTS

| | | | |
|---|---|---|---|
| 6,184,925 B1* | 2/2001 | Abe | H04N 23/663 348/263 |
| 8,294,101 B2* | 10/2012 | Dolce | G01J 1/4228 250/338.3 |
| 8,481,943 B2* | 7/2013 | Dolce | G01J 1/0271 250/339.04 |
| 2007/0016077 A1* | 1/2007 | Nakaoka | A61B 1/0638 600/129 |
| 2017/0090018 A1* | 3/2017 | Buettgen | G01S 7/4918 |
| 2018/0214057 A1* | 8/2018 | Schultz | A61B 5/742 |
| 2019/0137670 A1* | 5/2019 | Nagaya | H01L 31/08 |
| 2019/0391307 A1* | 12/2019 | Wheatley | G02B 5/22 |
| 2020/0004039 A1* | 1/2020 | Ogasahara | H04N 23/00 |
| 2020/0256729 A1* | 8/2020 | Prenner | G01J 3/10 |
| 2021/0341658 A1* | 11/2021 | Kim | H01L 27/14621 |
| 2022/0196470 A1* | 6/2022 | Fontenele | G01J 1/0403 |
| 2022/0368865 A1* | 11/2022 | Yako | G01J 3/0289 |

FOREIGN PATENT DOCUMENTS

| | | | |
|---|---|---|---|
| JP | 2009162508 A | † | 12/2007 |
| JP | 2009162508 A | * | 7/2009 |
| JP | 2009162508 A | | 7/2009 |
| WO | 2021162544 A1 | † | 8/2021 |

OTHER PUBLICATIONS

Pelaez Silvana Ayala et al, Comparison of Bifacial Solar Irradiance Model Predictions With Field Validation, IEEE Journal of Photovoltaics, I E E E, US, vol. 9, No. 1, doi:10.1109/JPHOTOV.2018. 2877000, ISSN 2156-3381, (Jan. 1, 2019), pp. 82-88, (Dec. 21, 2018), XP011694437 [A] 1-14 * section III; pp. 85-86; figure 3 * (Ayala).†

Anonymous, How to measure albedo for bifacial PV, (Jan. 1, 2004), URL: https://www.hukseflux.com/uploads/inline/note-how_to_measure_albedo_for_bifacial_pv_v2004.pdf, (Oct. 30, 2020), XP055745699 [A] 1-14 * pp. 2-4; figures 2,3 (Hukseflux).†

Albedo measurement for bifacial PV modules—Kipp & Zonen, (Jul. 12, 2018), URL: https://www.kippzonen.com/News/847/Albedo-measurement-for-bifacial-PV-modules#.X5xijdBKjtU, (Oct. 30, 2020), XP055745722 [A] 1-14 * the whole document * (Kipp).†

\* cited by examiner
† cited by third party

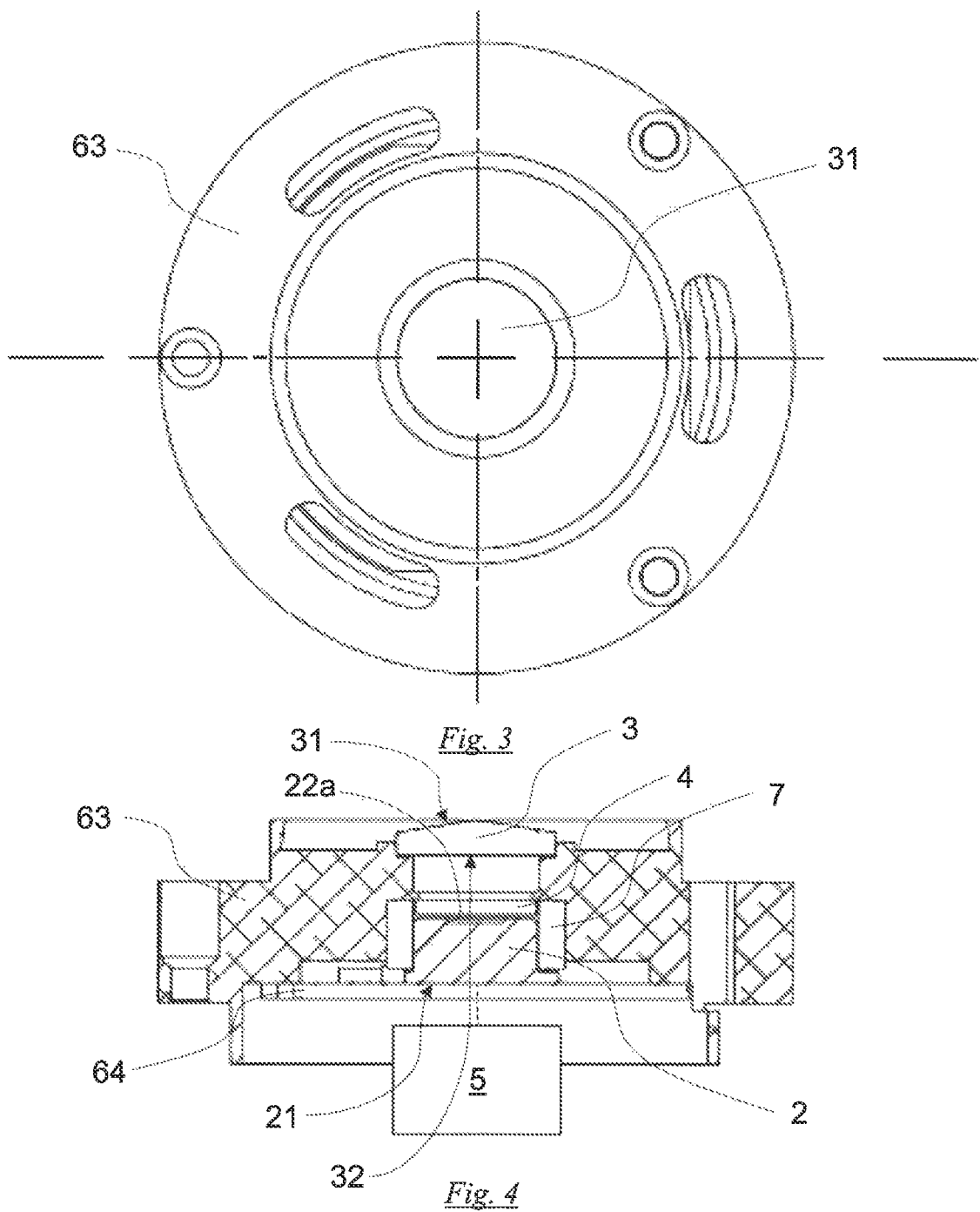

PYRANOMETER

The present application claims priority to European Patent Application No. EP20216772, which was filed on Dec. 23, 2020, the contents of which are hereby incorporated by reference.

TECHNICAL FIELD

The present invention relates to a pyranometer for measuring an irradiance amount, e.g. solar irradiance amount.

BACKGROUND

A pyranometer is a measuring instrument that detects the irradiance amount, e.g. the solar irradiance amount, incident on a surface.

According to the working principle for the measurement of irradiance, pyranometers can be grouped in two different categories, that is thermopile-based sensor pyranometers and silicon semiconductor-based pyranometers.

As to the thermopile-based sensor pyranometers, the irradiance is measured by a sensor based on thermopiles and designed to measure a substantially broad band of the radiation flux density, from about a 180° field of view angle. The thermopile-based sensor arranged below a transparent dome, particularly a dome made of glass, the latter limiting the spectral response from about 190 to about 4000 nanometers, particularly from about 300 to about 2800 nanometers, while substantially preserving about the 180° field of view. At the same time, the glass dome has the function of protecting the thermopile-based sensor from the external environment.

Pyranometers can be used in conjunction with other systems, among others solar simulators, photovoltaic systems, and meteorological stations. In these systems, the solar radiation measured by the pyranometer sed for determining other parameters and/or performances of the system, for example the photovoltaic module effective power. Therefore, the measurement accuracy of a pyranometer is one outmost aspect of this measuring instrument. Particularly, the measurement accuracy of the pyranometer is even more one outmost aspect in climate applications where changes of parts of a percent over years are recorded.

Pyranometers can be characterized by their degree of spectral sensitivity (spectral response), that is the capacity of the pyranometer to sense the radiation within a certain range of the radiation spectrum. The radiation spectrum that is measured by a pyranometer can be influenced (may change due to) by many factors, among others the incident angle of the radiation (e.g. solar radiation) (sun angle) and the atmospheric conditions, i.e. the presence of clouds and aerosols.

In order to achieve a high measurement accuracy, the pyranometer spectral response (light sensitivity) should be preferably as constant as possible for different ranges of the radiation spectrum (light spectrum). A classification of the pyranometer spectral response to different light spectra is specifically provided by the standard ISO 9060:2018.

Particularly, in order to achieve a substantially constant pyranometer spectral response, known thermopile-based pyranometers are provided with a black coated thermopile sensor and with a glass dome. The black coated thermopile sensor is capable of substantially absorbing (almost) all ration (e.g. solar radiation), thus, obtaining a substantially flat spectrum ranging from about 300 to about 50,000 nm. The glass dome limits the spectral response from about 300 to about 2800 nm, cutting off the portion above about 2800 nm, while substantially preserving the 180° field of view.

However, a substantially constant pyranometer spectral response is not achieved in pyranometers comprising micro thermopile-based sensors arranged in combination with a diffusor.

Micro thermopile-based sensors are characterized by a faster response time and by a more stable thermal behavior. However, in order to achieve the required field of view, micro thermopile-based sensors are combined with an optical diffusor. The diffusor is an optical element (optical diffusor) that is configured to diffuse and transmit the light incident thereon, toward the receiving surface of the radiation sensor. The optical diffusor is positioned on top of the micro thermopile-based sensor so as to substantially oppose the receiving surface of the micro thermopile-based sensor. As a result, the light external to the pyranometer and incident on the diffusor, can be diffused on the receiving surface of the micro thermopile-based sensor.

However, when a micro thermopile-based sensor is combined with an optical diffusor, a considerable variation of the spectral response with the wavelength occurs. In other words, a combined spectral response (combination of the thermopile-based sensor spectral response and diffusor spectral responses), substantially varies with the wavelength of the relevant spectrum.

As a result, the measurement accuracy of pyranometers provided with optical diffusors, is negatively affected.

Accordingly, there is the need to improve the measurement accuracy of pyranometers provided with optical diffusors.

SUMMARY

An object of the present invention is enhancing the measurement accuracy of a pyranometer.

The above objects are solved by the features of the independent claim, wherein particular embodiments are subject of the dependent claims.

According to an aspect, there is provided a pyranometer comprising a dome; a thermopile-based sensor comprising a receiving surface; a diffusor configured to diffuse radiation external to the pyranometer and passing through the dome, toward the receiving surface of thermopile-based sensor; and at least one optical filter arranged in an optical path of the radiation in front of the receiving surface of the thermopile-based sensor so as to modify the spectral composition of the radiation measured by the thermopile-based sensor.

Specifically, an optical filter arranged in the optical path of the radiation, particularly in front of the receiving surface of the thermopile-based sensor, allows to modify the spectral composition of the radiation passing through the dome and/or the diffusor and that is measured by the thermopile-based sensor. Particularly, the radiation incident on the dome and/or diffusor may be solar radiation. As a result, a substantially spectrally flat response can be obtained. In other words, the pyranometer has a substantially invariant spectral response, Particularly, the spectral response of the pyranometer is not affected by the variation caused by the inclusion of an optical diffusor in the optical path and/or by the spectral selectivity of the thermopile-based sensor. Further particularly, the optical filter also provides (at least partial) compensation for the Fresnel losses of the dome.

Additionally, in absence of an optical filter arranged as above disclosed, the measured output of the pyranometer will depend on the irradiance levels, as well as on changes in the irradiance spectrum resulting from the changes in the solar zenith angle (sun angle) and the atmospheric conditions, e.g. presence of clouds. Specifically, an optical filter according to the above allows the response of the pyranometer to be substantially invariant under different specifically spectral conditions, particularly atmospheric conditions such as wind, temperature, rain etc. etc. In other words, the present disclosure provides for a thermopile-based pyranometer having an invariant spectral response. Particularly, the spectral response may be invariant under different solar and/or atmospheric conditions (time of the day, sun angle, clear or cloudy sky, level of soiling on dome of pyranometer, etc.), that influence the spectrum of the solar irradiance. More specifically, the measurement accuracy of the pyranometer is enhanced.

Particularly, the at least one optical filter at least partly compensates a spectral selectivity of the thermopile-based sensor and/or the diffusor, and/or the dome (i.e. of the thermopile-based sensor, of the diffusor, or of the dome; or of the combined thermopile-based sensor and diffusor, and/or of the dome).

Specifically, an optical filter that at least partially compensates the spectral selectivity of the thermopile-based sensor and/or the diffusor allows the pyranometer to be substantially invariant to changing atmospheric conditions, wherein the latter results in changes in the spectral composition of the incoming radiation, particularly changes in the spectral composition of the incoming solar radiation. Accordingly, the measurement accuracy of the pyranometer is enhanced.

Particularly, the at least one optical filter modifies the spectral composition of the radiation (solar radiation) measured by the thermopile-based sensor such that spectral selectivity based on a spectral absorptance and a spectral transmittance of the thermopile-based sensor, and/or the diffusor, and/or the dome, has a maximum percentual deviation of about ±3% from a mean value, between in a wavelength range of the radiation (solar radiation) spectrum ranging from about 350 nm to about 1500 nm.

Specifically, the optical filter having the above configuration makes the pyranometer response spectrally flat, particularly within a maximum percentual deviation from a mean value. Accordingly, the measurement accuracy of the pyranometer is enhanced.

Further particularly, the at least one optical filter may be configured such that a transmittance of the at least one optical filter is greater for a spectrum wavelength lower than about 400 nm than the transmittance of the at least one optical filter for a spectrum wavelength greater than about 700 nm.

Specifically, the optical filter having the above configuration makes the pyranometer response substantially spectrally flat (or at least flatter), particularly by at least compensating the spectral characteristics of the diffusor and/or of the thermopile-based sensor. Accordingly, the measurement accuracy of the pyranometer is enhanced.

Further particularly, the at least one optical filter comprises a one or more layers, each layer being configured to have different refracting, transmission, absorption and/or reflection characteristics for a given specified radiation (solar radiation) wavelength value or range.

Specifically, the optical filter having the above configuration makes the pyranometer response substantially spectrally flat, particularly by compensating the spectral characteristics of the diffusor and/or of the thermopile-based sensor. Accordingly, the measurement accuracy of the pyranometer is enhanced.

Particularly, the at least one optical filter may be arranged on the optical path between the diffusor and the receiving surface of the thermopile-based sensor.

Further particularly, the at least one optical filter may be arranged to substantially face the receiving surface of the thermopile-based sensor, particularly wherein the at least one optical filter may be arranged to substantially face an active black coating surface of the thermopile-based sensor.

Further particularly, the at least one optical filter is embedded in a material of the active black coating of the thermopile-based sensor.

Further particularly, the thermopile-based sensor may be at least partly located in a housing, and wherein the at least one optical filter may be arranged to substantially cover a window of the housing.

Further particularly, the at least one optical filter may be arranged to at least partially cover an external surface of the diffusor.

Further particularly, the at least one optical filter may be arranged on an inner part of the diffusor.

Further particularly, the at least one optical filter may be arranged to at least partially cover the inner surface and/or the outer surface of the dome.

Further particularly, the at least one optical filter may comprise one or more vacuum deposited dielectric metal layers.

Further particularly, the at least one optical filter may be a transmission interference filter.

Further particularly, the at least one optical filter may be a reflection filter.

Further particularly, the at least one optical filter may be an absorption filter.

Further particularly, the pyranometer may further comprise at least one collimator configured to collimate the radiation (solar radiation) impinging on the receiving surface of the thermopile-based sensor.

Specifically, a collimator configured to collimate the radiation (solar radiation) impinging on the receiving surface of the thermopile-based sensor allows to modify the optical path followed by the radiation (solar radiation) in the pyranometer. Specifically, the transmission of the radiation (solar radiation) is optimized.

Further particularly, a distance of an optical path between the diffusor and the thermopile-based sensor may be set such that the radiation (solar radiation) diffused by the diffusor on the receiving surface of the thermopile-based sensor has a substantially cone shape.

SUMMARY OF THE DRAWINGS

These and other objects, features and advantages of the present invention will become more apparent upon a reading of the following detailed description and accompanying drawings. It should be understood that even though embodiments are separately described, single features thereof may be combined to additional embodiments.

FIG. 3, is a plan view of the pyranometer according to the present invention;

FIG. 4, is a cross-section view of the pyranometer shown in FIG. 3;

Figure 1:
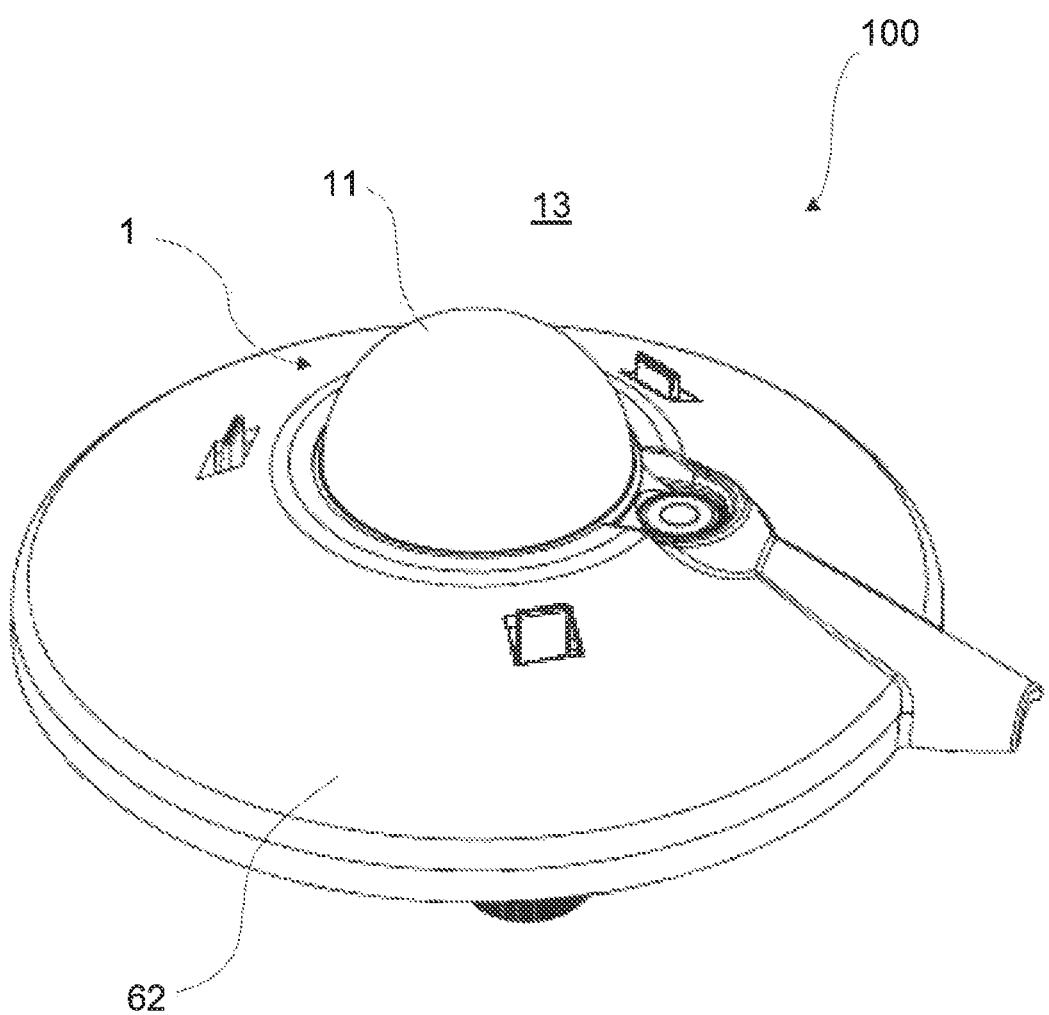
FIG. 1, is an axonometric view of the pyranometer according to an aspect of the present invention.

With reference to the above figures, the pyranometer according to the present invention is indicated in its entirety with the reference number 100.

With reference to FIGS. 1 and 5 to 8, the pyranometer according to the present disclosure is indicated in its entirety with the reference number 100. The pyranometer 100 comprises a dome 1. The dome 1 may be an outer dome of the pyranometer 100. In other words, when mounted on the pyranometer 100, the dome 1 may form the outermost dome 1 of the pyranometer 100. If the dome 1 is an outer transparent dome 1 of the pyranometer 100, an outer surface 11 of the dome 1 substantially faces an environment 13 external to the pyranometer 100. In contrast, an inner surface 12 of the dome 1 substantially encloses a cavity 10. Particularly, the cavity 10 is an air cavity underneath the dome 1. Thus, the inner surface 12 of the dome 1 substantially faces the cavity 10. The cavity 10 substantially corresponds to the space that encloses the cavity 10. Preferably, the cavity 10 may have a substantially hemispherical shape and includes a bottom opening 14 having a substantially circular shape.

The dome 1 may comprise an edge 15. The edge 15 may be a perimetric edge substantially forming the rim of the dome 1. The edge 15 may have preferably a substantially annular shaped surface. Particularly, a difference between the external radius, that is the radius of the outer surface 11, and the internal radius, that is the radius of the inner surface 12, substantially corresponds the thickness of the dome 1.

The dome 1 is at least partially transparent to a radiation (e.g. solar light). Particularly, the radiation may be solar radiation. Particularly, the dome 1 is configured to limit the spectral response from about 190 to about 4000 nanometers (nm), preferably from about 300 to about 2800 nanometers (nm), while particularly substantially preserving the 180° field of view. The transparency of the dome 1 may be particularly such that at least about 60%, more particularly at least about 70% of the incident radiation (e.g. solar radiation or light) in the relevant spectral range may pass therethrough. In other words, the dome 1 is configured to allow at least a portion of the radiation spectrum to be transmitted from the external environment 13, through the outer surface 11, through the material forming the dome 1 and through the inner surface 12, into the cavity 10. In the cavity 10, the radiation can be measured as will be described in more details hereafter.

The dome 1 may be made of any suitable at least partially transparent material that allows the transmission of a radiation (particularly solar radiation or light) therethrough. Particularly, the dome 1 may be made of any material having such physical/chemical characteristics so as to physically protect the measuring surface of the pyranometer 100 yet at the same time being transparent to (most) of the light (at least partially transparent for a spectrum of radiation (e.g. solar radiation) the pyranometer 100 is intended to detect). For example, the dome 1 may be made of glass, quartz or sapphire. Alternatively, the dome 1 may be made of a transparent thermoplastic polymeric material, i.e. poly(methyl methacrylate) (PMMA) also known as acrylic, acrylic glass, or plexiglass.

Referring to FIGS. 1 to 8, the pyranometer 100 comprises a pyranometer housing 6. The pyranometer housing 6 may be, or may comprise, a container configured to contain the components of the pyranometer 100, e.g. a thermopile-based sensor 2, a diffusor 3, a optical filter 4, and/or a control unit 5. These components, as well as their functions, will be hereafter described in more details. The pyranometer housing 6 may be provided with one or more levelling feet(s) 61 for supporting the pyranometer housing 6 on a supporting surface S. The levelling feet(s) 61 also allows the pyranometer housing 6 to be levelled on the supporting surface S.

As shown in FIGS. 1 to 4, the pyranometer housing 6 may comprise a first (outer) portion 62 and a second (inner) portion 63. The first portion 62 may be an outer covering portion arranged to cover and, thus, protect the second portion 63 from the environment 13 external to the pyranometer 100. Particularly, the first portion 62 may be configured to, at least partially, enclose the second portion 63. The first portion 62 may be a sunscreen removably connected by one or more clip(s) to the second portion 63.

Figure 2:
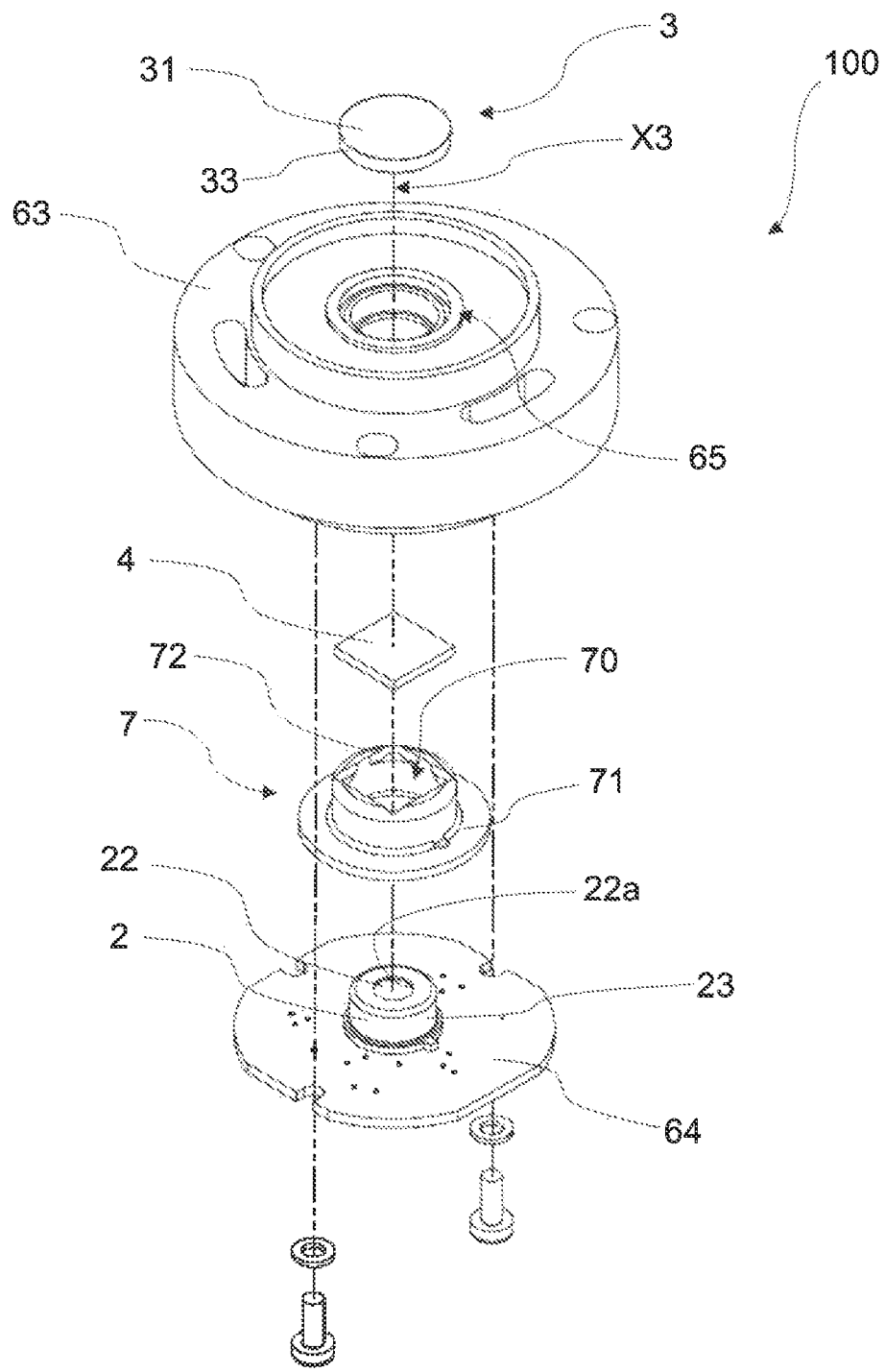
FIG. 2, is an axonometric exploded view of a portion of the pyranometer illustrated in FIG. 1.

As shown in FIG. 2, the second portion 63 may be configured to support the thermopile-based sensor 2, a diffusor 3, and/or a optical filter 4. Particularly, the second portion 63 may comprise a supporting plate 64 that is configured to support the thermopile-based sensor 2.

The thermopile-based sensor 2 may be directly, or indirectly, connected to the supporting plate 64. In turn, the supporting plate 64 may directly be, or indirectly, removably coupled to the second portion 63 so as to enclose the thermopile-based sensor 2 therebetween. Specifically, the thermopile-based sensor 2 may be located in a cavity surrounded by the second portion 63 of the housing 6 and the supporting plate 64.

A top surface of the first portion 62 may be also directly, or indirectly, removably coupled to the edge 15 of the dome 1 such that the dome 1 can be connected to the housing 6, as shown in FIGS. 1 and 5 to 8.

As shown in FIGS. 2, 4, 5 to 8, the pyranometer 100 comprises the thermopile-based sensor 2. The thermopile-based sensor 2 is a measuring sensor configured to measure the radiation impinging the pyranometer 100. Particularly, the radiation impinging the pyranometer 100 may be solar radiation. The thermopile-based sensor 2 may be based on thermopiles particularly suitable to measure the broad band of the radiation flux density specifically from a substantially 180° field of view angle. A thermopile specifically is an electronic device that converts thermal energy into electrical energy and comprises several thermocouples connected in series or in parallel. The thermopile works on the principle of the thermoelectric effect of generating a voltage when its dissimilar metals or thermocouples are exposed to a temperature difference. Thermocouples operate by measuring the temperature differential from their junction point to the point in which the thermocouple output voltage is measured. Once a closed circuit is made up of more than one metal and there is a difference in temperature between junctions and points of transition from one metal to another, a current is produced as if generated by a difference of potential between the junctions being at different temperatures. In other words, the pyranometer 100 of the present disclosure particularly is a thermopile pyranometer (also referred to as thermo-electric pyranometer).

Specifically, the thermopile pyranometer 100 particularly detects light of about 300 to about 2800 nm with a largely flat spectral sensitivity, Specifically, the thermopile-based sensor 2 comprises a black coating which absorbs (particularly all) radiation (e.g. solar radiation or modified solar radiation modified e.g. in its spectral composition by the optical elements in front of it such as the dome 1 and/or the diffusor 3) impinging thereon. The active (hot) junctions of the thermocouples are located beneath (or in correspondence with or adjacent to) the black coating surface and are heated by the radiation absorbed from the black coating. The passive (cold) junctions of the thermocouples are (particularly fully) protected from radiation and in thermal contact with the pyranometer housing 6, which particularly serves as a heat-sink, Particularly, the passive (cold) junctions of the thermocouples are in contact with a thermopile housing 23 that may be in thermal contact with the pyranometer housing 6, so as to substantially dissipate the heat to or through the pyranometer housing 6. This specifically reduces or prevents any alteration from yellowing or decay when measuring the temperature in the shade, thus impairing the measure of the solar irradiance by the pyranometer 100.

Particularly, the thermopile-based sensor 2 may be a micro thermopile-based sensor, Particularly, the thermopile may be located in a TO (transistor outline) housing having a diameter in the range of about 1 mm to about 20 mm or lower than about 10 mm. Particularly, the TO housing and/or active component(s) of thermopile-based sensor 2 may be micro machined.

Figure 7:
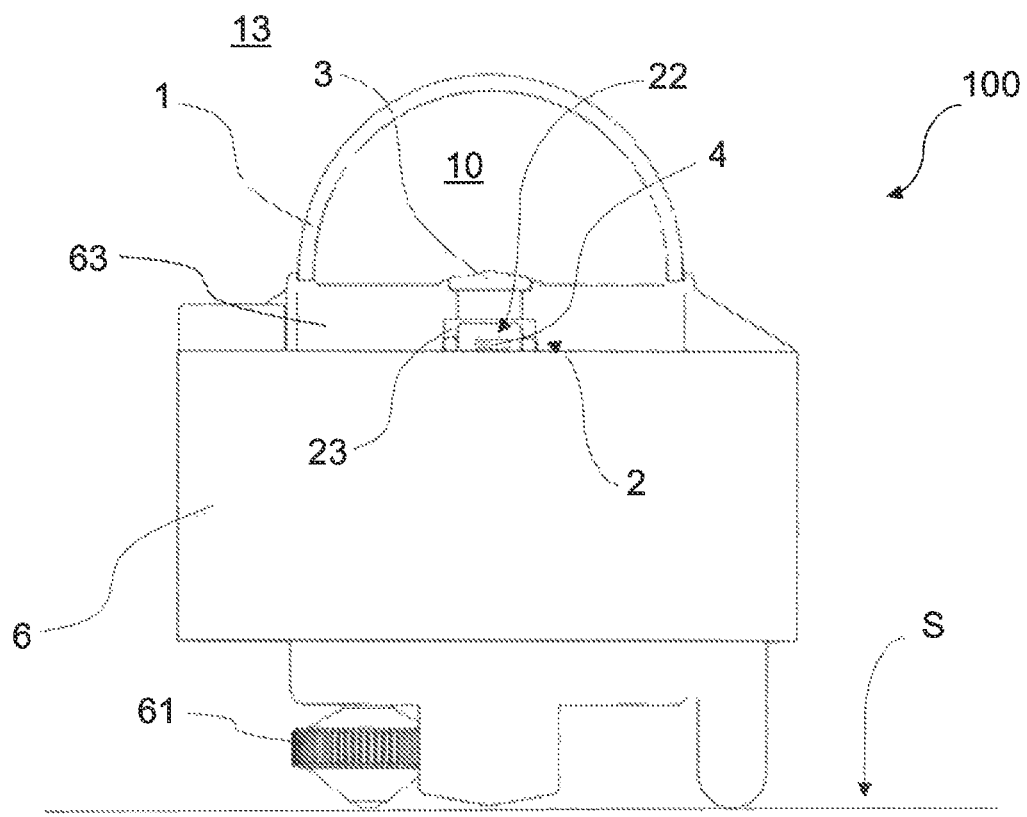
Figure 8:
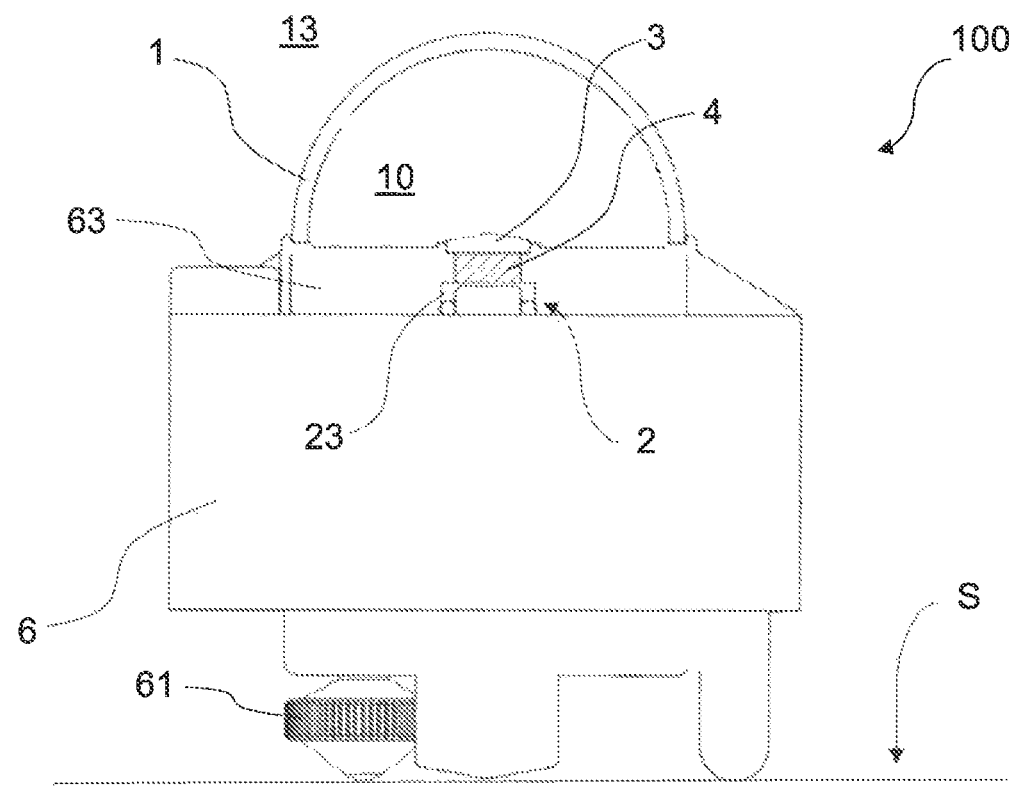

As shown in FIGS. 2 and 7, the thermopile-based sensor 2 comprises a receiving surface 22 and a second opposite (bottom) surface 21. The receiving surface 22 of the thermopile-based sensor 2 may comprise, or may correspond to, the black coating surface. The second surface 21 substantially faces the supporting plate 64. Particularly, the second surface 21 may directly, or indirectly, contact the supporting plate 64 such that the thermopile-based sensor 2 is directly, or indirectly, supported by supporting plate 64.

The receiving surface 22 is configured to substantially receive the radiation impinging the pyranometer 100. Particularly, the radiation impinging the pyranometer 100 may be solar radiation. Particularly, the solar radiation impinging the pyranometer 100 is at least partially transmitted through the dome 1 and diffused on the receiving surface 22 of the thermopile-based sensor 2, by means of the diffusor 3, Therefore, the diffusor 3 is specifically arranged to diffuse the radiation passing through the dome 1, on the receiving surface 22 of the thermopile-based sensor 2. Particularly, the thermopile-based sensor 2 and the diffusor 3 may be stacked one on top of the other.

As shown in FIG. 2, the thermopile-based sensor 2 may be located in a housing 23 provided with a window 22a. The housing 23 may have or define a cavity configured to integrally at least partly contain the thermopile-based sensor 2. The window 22a of the housing 23 may be arranged to substantially face the receiving surface 22 of the thermopile-based sensor 2 on a bottom side. Particularly, a gap may be present between the receiving surface 22 and the window 22a in order to particularly prevent thermal leakage which may degrade the sensor performance. The window 22a of the housing 23 may be arranged to substantially face a second (bottom) surface 32 of the diffusor 3 on an upper side. Particularly, a gap may be present between the second (bottom) surface 32 of the diffusor 3 and the window 22a. In other words, the window 22a of the housing 23 may be substantially arranged between, but not being in contact with, the second (bottom) surface 32 of the diffusor 3, and the receiving surface 22 of the thermopile-based sensor 2. The window 22a of the housing 23 is at least partially transparent to the radiation (light). Particularly, the window 22a of the housing 23 may have a transparency such that at least about 60%, more particularly at least about 70% of the incident radiation (light) in the relevant spectral range may pass therethrough. Accordingly, the window 22a of the housing 23 may be also part of an optical path of the radiation that will be described in detail hereinafter.

As shown in FIGS. 1 to 8, the pyranometer 100 comprises the diffusor 3. The diffusor 3 is configured to diffuse radiation (e.g. solar radiation or light) external to the pyranometer 100, and passing through the dome 1, toward the receiving surface 22 of thermopile-based sensor 2. Accordingly, the radiation impinging the receiving surface 22 of the thermopile-based sensor 2 can be measured by the thermopile-based sensor 2.

The diffusor 3 is an optical element that has an incident first or top surface 31 substantially facing the cavity 10 of the dome 1, particularly when the diffusor 3 is mounted on the pyranometer 100. In other words, the diffusor 3 is arranged such that the incident surface 31 substantially faces the inner surface 12 of the dome 1, in cavity 10. Particularly, the diffusor 3 may be located in a through-opening 65 provided in the second portion 63 of the pyranometer housing 6 such that the incident surface 31 of the diffusor 3 substantially faces the inner surface 12 of the dome 1. The diffusor 3 comprises a second (bottom) surface 32 that is substantially opposite to the incident first or top surface 31 and at least one side surface 33. The second surface 32 is substantially opposite to the incident surface 31 and substantially faces the receiving surface 22 of the thermopile-based sensor 2, when the diffusor 3 is mounted on the pyranometer 100. In other words, the diffusor 3 is arranged such that the second bottom surface 32 substantially faces the receiving surface 22 of the thermopile-based sensor 2. The incident surface 31 may be a flat circularly shaped surface, a conically shaped surface, a convex surface, a concave surface, or an inverted conical surface. Particularly, the diffusor 3 may be axisymmetric, that is symmetric about a longitudinal axis X3 of the diffusor 3. In other words, the diffusor 3 may be a rotationally symmetric body having a longitudinal axis X3. For example, the diffusor 3 may have a substantially cylindrically shaped side surface 33 and/or comprising a conically shaped incident first or top surface 31.

As shown in FIGS. 2, 4 to 8, the diffusor 3 may be arranged such that the second surface 32 substantially faces toward the receiving surface 22 of the thermopile-based sensor 2, whereas the incident surface 31 substantially faces towards the inner surface 12 of the dome 1.

Accordingly, the radiation or light (or solar radiation) external to the dome 1 enters the cavity 10 through the dome 1. In the cavity 10, the radiation or light impinges the incident surface 31 of the diffusor 3 and it is at least partly transmitted through the diffusor 3 towards the thermopile-based sensor 2, particularly the receiving surface 22 of the thermopile-based sensor 2, as shown in FIG. 4. The radiation or light (e.g. solar radiation) reaching the thermopile-based sensor 2 can be thus measured by the latter.

The diffusor 3 may comprise or be made of any material that allows a light incident thereon to be diffused and transmitted through the diffusor 3. For example, the diffusor 3 may comprise, or be made, of at least partially porous material, such as bubble quartz.

As shown in FIG. 4, the pyranometer 100 may comprise at least one control unit 5. The control unit 5 may be operatively connected to the thermopile-based sensor 2. The control unit 5 may be a controller, preferably a micro controller. The control unit 5 may be located in the pyranometer housing 6.

Particularly, the control unit 5 may be configured to modify a radiation output (solar radiation output) measured by the thermopile-based sensor 2, based on a correction factor. In other words, the control unit 5 may be configured to perform a post processing correction of the radiation measured by the thermopile-based sensor 2. Specifically, by modifying a radiation output measured by the thermopile-based sensor 2, based on a correction factor, a post processing correction can be performed. Accordingly, a more precise irradiance measurement can be achieved.

With reference to FIGS. 2, 4, 5 to 8, the pyranometer 100 further comprises at least one optical filter 4. Particularly, the optical filter 4 may be a solar radiation optical filter.

The optical filter 4 is arranged in an optical path of the radiation, particularly in front of the receiving surface 22 of the thermopile-based sensor 2. The optical path is a path followed by the radiation (solar radiation) while passing through the components of the pyranometer, and before impinging the receiving surface 22 of the thermopile-based sensor 2. As a result, the radiation impinging the receiving surface 22 of the thermopile-based sensor 2 can be filtered by the optical filter 4. Specifically, the spectral composition of the radiation impinging on or measured by the thermopile-based sensor 2 is modified by the optical filter 4.

The optical path followed by the radiation (solar radiation) may comprise (starting from the environment 13 external to the pyranometer 100): the outer surface 11 of the dome 1, the inner material of the dome 1, the inner surface 12 of the dome 1, the cavity 10, the incident surface 31 of the diffusor 3, the inner material of the diffusor 3, the second bottom surface 32 of the diffusor 3, the window 22*a* of the housing 23 and/or the receiving surface 22 of the thermopile-based sensor 2. In other words, the radiation external to the pyranometer 100, particularly the solar radiation, and impinging the pyranometer 100, may pass through the above-mentioned elements and/or surfaces, before reaching the receiving surface 22 of the thermopile-based sensor 2.

Particularly, the "spectral composition" of the radiation refers to the energy composition of the solar radiation in a range(s) of frequency(ies) (or range(s) of wavelength(s)) of the solar electromagnetic radiation (solar light). Particularly, modifying the spectral composition of the radiation refers to modifying the solar radiation flux density in a range(s) of frequency(ies) (or range(s) of wavelength(s)) of the solar radiation, before the latter impinges the receiving surface 22 of the thermopile-based sensor 2.

Figure 9:
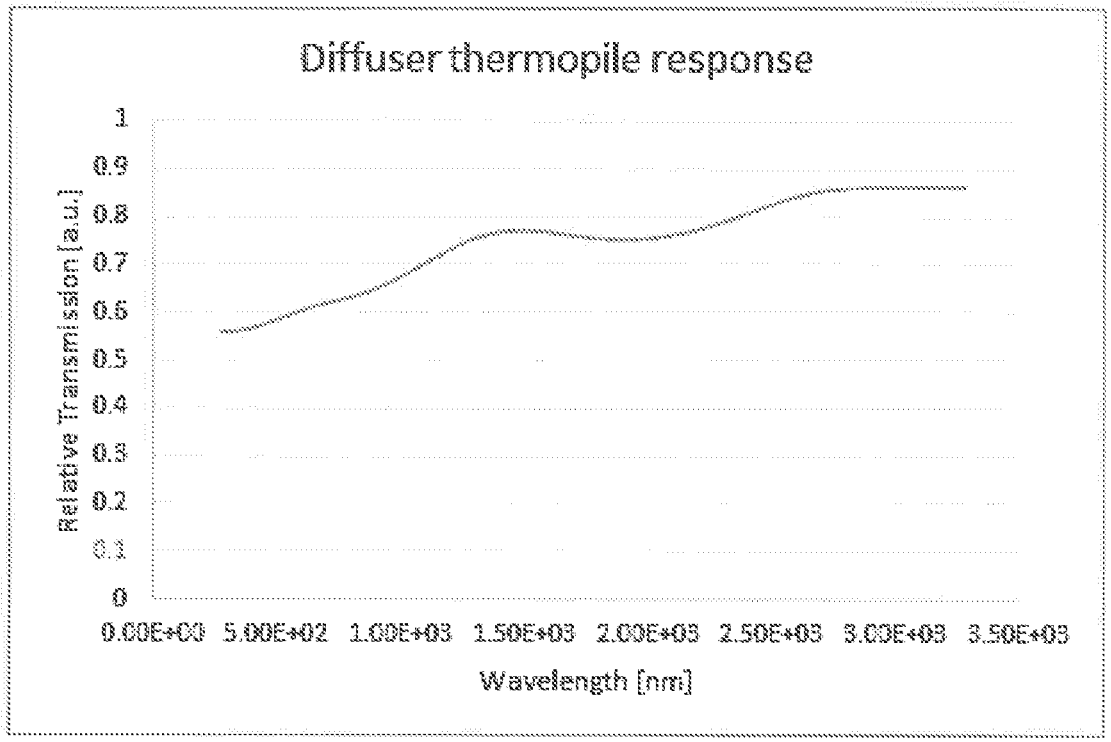
FIG. 9, is a diagram illustrating the spectral selectivity of the optical diffusor.

The optical filter 4 may be configured to at least partly compensate a spectral selectivity of the thermopile-based sensor 2, and/or of the diffusor 3 and/or of the dome 1. In other words, the thermopile-based sensor 2 and/or the diffusor 3 may have a spectral selectivity or spectral transmission property that varies with the wavelength of the (solar) radiation spectrum as shown in FIG. 9 with regard to the diffusor 3. For example, the thermopile-based sensor 2 and/or the diffusor 3 may exhibit a greater transmission property (total transmittance) for solar radiation within a certain wavelength range of the solar radiation spectrum, and a different, particularly lower, transmission property (total transmittance) for a solar radiation within a different wavelength range of the solar radiation spectrum. In other words, the transmission property of the thermopile-based sensor 2, of the diffusor 3 and/or of the dome 1, and/or of a combination thereof (a combined spectral selectivity or spectral transmission property of the diffusor 3, of the thermopile-based sensor 2 and/or of the dome 1) is not substantially constant within a relevant wavelength range of the solar radiation spectrum. Thus, in order to achieve a spectrally flatter response or substantially a spectrally flat response, the optical filter 4 may be configured to at least partly compensate a spectral selectivity of the thermopile-based sensor 2 and/or the diffusor 3, In other words, the optical filter 4 may be configured to have a spectral selectivity or spectral transmission property that is substantially opposite or complementary to the spectral selectivity or spectral transmission property of the thermopile-based sensor 2 and/or of the diffusor 3, particularly within specified (predetermined or predeterminable) wavelength range(s). More particularly, the spectral selectivity or spectral transmission property may be in a wavelength range of the solar radiation spectrum ranging from about 350 nm to about 1500 nm. Specifically, the optical filter 4 at least partly compensates the spectral selectivity of a combination of both the thermopile-based sensor 2 and the diffusor 3.

Particularly, the optical filter 4 may be configured to modify (correct) the spectral composition of the radiation (e.g. solar radiation) measured by the thermopile-based sensor 2 such that the spectral selectivity based on a spectral absorptance and/or a spectral transmittance of the thermopile-based sensor 2 and/or the diffusor 3 has a maximum percentual deviation of about ±3% from a mean value in a wavelength range of the radiation spectrum ranging from about 350 nm to about 1500 nm, particularly as required by ISO 9080:2018.

More particularly, the spectral selectivity (or spectral transmission property) particularly is proportional to a product of the spectral absorbance and the spectral transmittance of the thermopile-based sensor 2 and/or the diffusor 3 and/or of the dome 1, specifically of a combination of both the thermopile-based sensor 2 and the diffusor 3. In other words, the spectral selectivity or property of the combination of the thermopile-based sensor 2 and the diffusor 3 should not exceed by about ±3% from the mean value in the wavelength range of the radiation spectrum (solar radiation spectrum) ranging from about 350 nm to about 1500 nm.

Accordingly, by placing the optical filter 4 in the optical path of the radiation (solar radiation) and which is configured to modify the spectral composition of the radiation measured by the thermopile-based sensor 2 so as to at least partly compensate the spectral selectivity of the thermopile-based sensor 2, of the diffusor 3 or of the combined thermopile-based sensor 2 and diffusor 3, it is possible to achieve the above mentioned maximum percentual deviation of about ±3% from a mean value in a wavelength range of the radiation spectrum ranging from about 350 nm to about 1500 nm.

Further specifically, by placing the optical filter 4 in the optical path of the radiation (e.g. solar radiation) and which is configured to modify the spectral composition of the radiation measured by the thermopile-based sensor 2, it is possible to achieve a spectral error that is less than 0.5% for standard spectra and which particularly results in a constraint over the entire range between about 280 nm to about 3500 nm.

Figure 10:
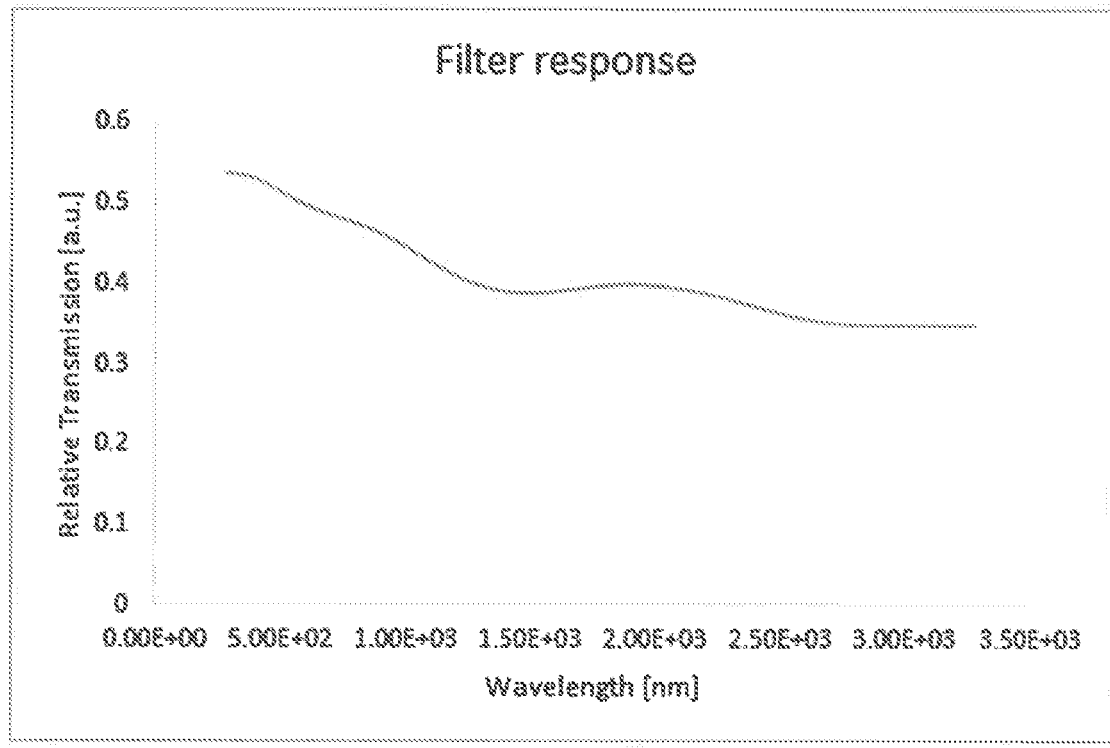
FIG. 10, is a diagram illustrating the spectral selectivity of the filter.

Particularly, as shown in FIG. 10, the optical filter 4 may be configured such that a (total) transmittance of the optical filter 4 is greater for a spectrum wavelength lower than about 400 nm than the (total) transmittance of the optical filter 4 for a spectrum wavelength greater than about 700 nm. In other words, the optical filter 4 may be configured to greatly transmit radiation (e.g. solar radiation) having a spectrum wavelength lower than about 400 nm (UV light), while slightly transmit radiation having a spectrum wavelength greater than about 700 nm (IR light), as shown in FIG. 10.

Specifically, as shown in FIG. 10, the optical filter 4 is configured to mostly suppress, or at least reducing, the transmission of radiation within the infrared range, while increasing the transmission of radiation within the UV light.

The at least one optical filter 4 may comprise one or more layers, each layer being configured to substantially have different transmission and/or reflection characteristics for a specified radiation (solar radiation) wavelength value or range. Particularly, the one or more layers may comprise one or more layers of metallic and/or nonmetallic material, each layer having different transmission and/or reflection characteristics for a specified radiation wavelength value, or range. Further particularly, the one or more layers may be selected such that a desired spectral selectivity or spectral transmission property of the at least one optical filter 4 is achieved. Particularly, the one or more layers may be selected so as to compensate a spectral selectivity of the thermopile-based sensor 2, and/or the diffusor 3, and/or of the dome 1, and/or of a combination thereof.

Particularly, the at least one optical filter 4 may be a transmission interference filter. A transmission interference filter comprises one or more thin dielectric layer(s) configured to transmit up to a certain amount of the incident radiation at a certain range(s) of frequencies (wavelength(s)). Particularly, the transmission interference filter may be an optical filter that transmit one or more spectral bands or lines, while maintaining a nearly zero coefficient of absorption for all wavelengths of interest. Particularly, the transmission filter may comprise multiple thin layers of dielectric (metallic) material having different transmittance characteristics. Particularly, the transmission filter may be wavelength selective.

Particularly, the at least one optical filter 4 may be a reflection filter. More particularly, the reflection filter may be an optical filter that reflects one or more spectral bands or lines and transmits others, while maintaining a nearly zero coefficient of absorption for all wavelengths of interest. Particularly, the reflection filter may comprise multiple thin layers of dielectric (metallic) material having different refractive indices. Particularly, the filter may be wavelength-selective by virtue of the interference effects that take place between the incident and reflected waves at thin-film boundaries.

Specifically, a reflection filter can be easily manufactured, and it can provide good filtering performances.

Particularly, the at least one optical filter 4 may be an absorption filter. Particularly, the absorption filter may be an optical filter that absorbs one or more spectral bands or lines, while transmitting and/or reflecting all wavelengths of interest, Particularly, the absorption filter may comprise multiple thin layers of dielectric (metallic) material having different absorption characteristics. Particularly, the absorption filter may be wavelength selective.

It should be understood that the optical filter 4 may comprise one or more filters being chosen from transmission filter, reflection filter and/or absorption filter.

According to a particular embodiment, the least one optical filter 4 may comprise one or more vacuum deposited dielectric metal layers. In other words, the at least one optical filter 4 may be vacuum deposited as a layer(s), or a as plurality of layers, on one or more components of the pyranometer 100, e.g. the diffusor 3, the window 22a of the housing 23 of the thermopile based sensor 2, the inner surface 12 of the dome 1, and/or the receiving surface 22 of the thermopile based sensor 2. As shown in FIGS. 5 to 8, the optical filter 4 may be located at different locations of the optical path so as to modify the spectral composition of the radiation (solar radiation) impinging on the receiving surface 22 of the thermopile-based sensor 2, It should be understood that the optical filter 4 may be located at the same time at different locations of the optical path in order to achieve the desired modification (particularly at least partly compensation) of the spectral composition of the radiation measured by the thermopile-based sensor 2.

Particularly, as shown in FIGS. 2 and 4, the at least one optical filter 4 may be arranged in the optical path, specifically between the diffusor 3 and the receiving surface 22 of the thermopile-based sensor 2. In other words, the optical filter 4 may be arranged at a location of the optical path between the diffusor 3, particularly the second bottom surface of the diffusor 3, and the receiving surface 22 of the thermopile-based sensor 2.

More particularly, the optical filter 4 may be arranged to substantially face, on one side, the second surface 32 of the diffusor 3, and to substantially face, on the opposite side, the housing 23 of the thermopile-based sensor 2, Specifically, by arranging the at least one optical filter 4 between the diffusor 3 and the thermopile-based sensor 2, the spectral composition of the radiation (solar radiation) impinging the receiving surface 22 of the thermopile-based sensor 2 can be modified by the optical filter 4.

As shown in FIG. 2, the pyranometer 100 may comprise a filter supporting element 7. The filter supporting element 7 may be configured to substantially, at least partially, enclose the thermopile-based sensor 2.

If the thermopile-based sensor 2 comprises a housing 25, the filter supporting element 7 may be configured to substantially, at least partially, enclose the housing 25 of the thermopile-based sensor 2.

Specifically, the filter supporting element 7 may include a through opening 70 having a shape that is substantially complementary to the external shape of the thermopile-based sensor 2 (or of the housing 25 of the thermopile-based sensor 2). For example, the through opening 70 may be circularly shaped.

The filter supporting element 7 may comprise a base portion 71. Particularly, the base portion 71 may be shaped as a flange. Specifically, the base portion 71 may be configured to directly, or indirectly, contact the supporting plate 64 so as to stably support the at least one optical filter 4 in the pyranometer housing 6.

Particularly, the optical filter 4 may be positioned and/or fixedly supported by the filter supporting element 7 with respect to the thermopile-based sensor 2.

The filter supporting element 7 may be configured to properly position the thermopile-based sensor 2, the optical filter 4 and/or the second portion 63 (particularly mounting the diffusor 3) of the pyranometer housing 6 with respect to each other.

The filter supporting element 7 may be removably coupled to the supporting plate 64 and/or to the thermopile-based sensor 2. The thermopile-based sensor 2 may tightly fit in the through opening 70 of the filter supporting element 7.

The filter supporting element 7 may comprise a groove 72. The groove 72 may be configured to removably support the optical filter 4. Particularly, the groove 72 may have a shape corresponding to an outer perimetral edge of the optical filter 4.

As shown in FIG. 2, the groove 72 may be located on a perimetral edge of the through opening 70. Accordingly, the filter supporting element 7 may be coupled to the thermopile-based sensor 2 while removably supporting the optical filter 4, such that the latter is substantially centered with respect to receiving surface 22 of the thermopile-based sensor 2.

Particularly, the filter supporting element 7 may be configured to support the optical filter 4 between the second bottom surface of the diffusor 3, and the thermopile-based sensor 2.

Figure 5:
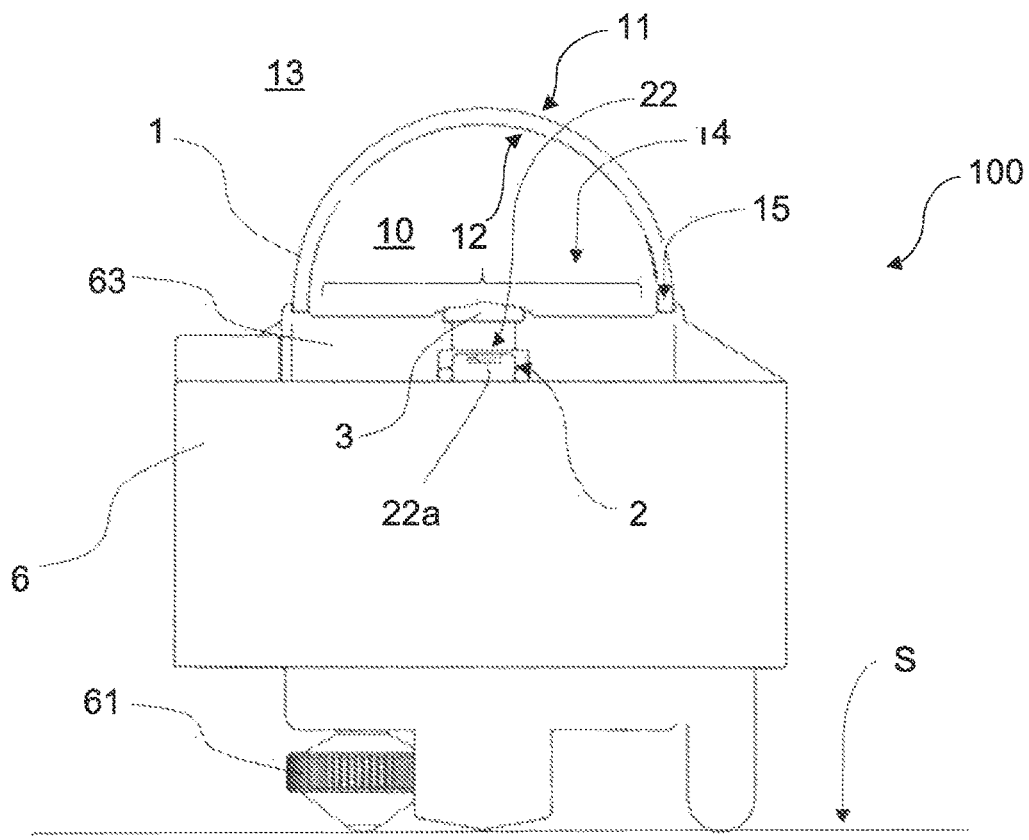
FIGS. 5 to 8, are cross-section lateral views of different arrangements of the optical filter according to the present invention.

As shown in FIG. 5, the optical filter 4 may be arranged to substantially cover the window 22a of the housing 23 of the thermopile-based sensor 2. In other words, if the thermopile-based sensor 2 is located in the housing 23, the optical filter 4 may be arranged to substantially cover the window 22a of the housing 23. Specifically, by arranging the at least one optical filter 4 to cover the window 22a of the housing 23, the spectral composition of the radiation (e.g. solar radiation) impinging the receiving surface 22 of the thermopile-based sensor 2 can be modified by the optical filter 4.

Figure 6:
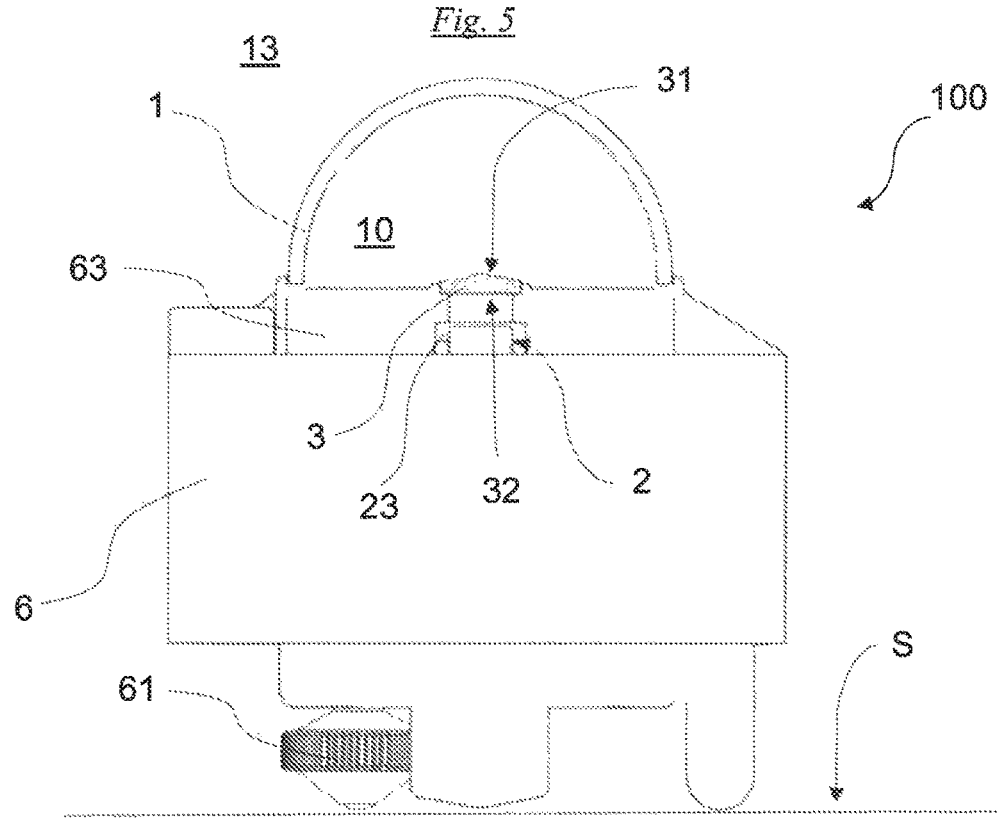

As shown in FIG. 6, the optical filter 4 may be arranged to at least partially cover an external surface of the diffusor 3. Particularly, the optical filter 4 may be arranged to at least partially cover the incident surface 31 of the diffusor 3, the second bottom surface 32 and/or the side surface 33 of the diffusor 3 such that the spectral composition of the radiation impinging the receiving surface 22 of the thermopile-based sensor 2 can be modified by the optical filter 4.

More particularly, the optical filter 4 may be also arranged on an inner part of the diffusor 3, that is the optical filter 4 may be configured as an inner layer(s) of the diffusor 3. Specifically, by arranging the at least one optical filter 4 to at least partially cover the diffusor 3, the spectral composition of the radiation impinging the receiving surface 22 of the thermopile-based sensor 2 can be modified by the optical filter 4.

As shown in FIG. 7, the optical filter 4 may be also arranged to substantially (at least partially) face the receiving surface 22 of the thermopile-based sensor 2, particularly without directly contacting the receiving surface 22 of the thermopile-based sensor 2. Further particularly, the optical filter 4 may be arranged to substantially face the active black coating surface of the thermopile-based sensor 2, particularly without directly contacting the active black coating of the thermopile-based sensor 2. Particularly, the at least one optical filter 4 may be also embedded in a material of the active black coating of the thermopile-based sensor 2. Specifically, the at least one optical filter 4 may be embedded in the active black coating as one or more layers of the material forming the active black coating.

According to an aspect (not illustrated), the at least one optical filter 4 may be arranged on or in the dome 1, specifically to at least partially cover the inner surface 12 and/or the outer surface 11 of the dome 1. Particularly, the optical filter 4 may comprise one or more dielectric metal layers vacuum deposited on the inner surface 12 and/or the outer surface 11 of the dome 1.

Particularly, the pyranometer 100 may further comprise at least one collimator (not illustrated). Particularly, the collimator may be configured to collimate the radiation (solar radiation) impinging on the receiving surface 22 of the thermopile-based sensor 2. Further particularly, the collimator may be arranged in the optical path of the radiation (solar radiation), for example between the diffusor 3 and the thermopile-based sensor 2; Alternatively, the collimator may be arranged below the window 22a of the thermopile housing 23 and/or above the receiving surface 22 of the thermopile based sensor 2. Further alternatively, the collimator may be arranged between the window 22a and/or below the optical filter 4, and/or the collimator may be arranged between the optical filter 4 and the diffusor 3. Alternatively, the collimator may be configured to collimate the radiation (solar radiation) impinging the at least one optical filter 4. Specifically, a collimator configured to collimate the radiation (e.g. solar radiation) impinging on the receiving surface of the thermopile-based sensor 2 allows to modify the optical path of the radiation. Specifically, the transmission of the radiation can be optimized by collimating the radiation, particularly the solar radiation.

According to an aspect, a distance of the optical path between the diffusor 3 and the thermopile-based sensor 2 (distance between the second bottom surface 32 of the diffusor 3 and the receiving surface 22 of the thermopile-based sensor 2) may be set so as to tune the angular distribution of the radiation (e.g. solar radiation or light). Particularly, a minimum distance between the diffusor 3 and the optical filter 4 may be set to be at least about 1 mm. Particularly, a minimum distance between the optical filter 4 and the thermopile based sensor 2 may be set to be at least about 1 mm. In other words, mechanical contact between the diffusor 3 and/or the optical filter 4, and/or the thermopile-based sensor 2 particularly is avoided. More particularly, a minimum distance between the diffusor 3 and the thermopile-based sensor 2 may be set to be at least about 3 mm. More particularly, the minimum distance between the diffusor 3 and the thermopile-based sensor 2 may be set to be at least between about 3 mm and about 10 mm. Particularly, the distance of an optical path between the diffusor 3 and the thermopile-based sensor 2 may be set such that the radiation (e.g. solar radiation) diffused by the diffusor 3 and impinging on the receiving surface 22 of the thermopile-based sensor 2 has a substantially cone shape, that is the radiation is configured as a divergent beam. Particularly, the radiation may diverge with respect to a center longitudinal axis of the radiation beam with a half angle greater than about 10°. In other words, the radiation beam may have a diverging angle substantially greater than about 20°.

Specifically, modifying the optical path (distance) between the diffusor 3 and the thermopile-based sensor 2, it is possible to tune the angular distribution of the light impinging on or detected by the thermopile-based sensor 2. Accordingly, the performances of the optical filter 4 can be improved by setting a specified (predetermined or predeterminable) distance between the diffusor 3 and the thermopile-based sensor 2. Particularly, by setting the distance between the diffusor 3 and the thermopile-based sensor 2 such that the radiation (light) impinging on the thermopile-based sensor is substantially beam shaped (it has a substantially cone shape), it has the effect that the spectral response slightly shifts with the variation of the wavelength. Particularly, there are usually oscillations on (dielectric) filters that have a relatively high frequency (or short period) with wavelength. Because of the slight shift due to different angles, these oscillations can be smoothed or reduced considerably by setting the diffusor 3 and the thermopile-based sensor 2 at a predetermined distance. In other words, by tuning the angular distribution by particularly setting the diffusor 3 and the thermopile-based sensor 2 at a predetermined distance, it is possible to improve the performance of the filter.

REFERENCE NUMBERS

1 . . . dome
2 . . . thermopile-based sensor
3 . . . diffusor
4 . . . optical filter
5 . . . control unit
6 . . . pyranometer housing 7 . . . filter supporting element
10 . . . cavity
11 . . . outer surface of the dome
12 . . . inner surface of the dome
13 . . . environment external to the pyranometer
14 . . . bottom opening of the dome
15 . . . edge of the dome
21 . . . second (bottom) surface of the thermopile-based sensor
22 . . . receiving surface of the thermopile-based sensor
22a . . . window of the housing
23 . . . housing of the thermopile
31 . . . first incident or top surface of the diffusor
32 . . . second (bottom) surface of the diffusor
33 . . . side surface of the diffusor
61 . . . levelling feet(s) of the pyranometer housing
62 . . . first (outer) portion of the pyranometer housing
63 . . . second (inner) portion of the pyranometer housing
64 . . . supporting plate
65 . . . through opening of the second portion of the pyranometer housing
70 . . . through opening of the filter supporting element
71 . . . base portion
72 . . . groove
100 . . . pyranometer
S . . . supporting surface
X3 . . . longitudinal axis of the diffusor

The invention claimed is:

1. A pyranometer, comprising:
   a dome;
   a thermopile-based sensor comprising a receiving surface;
   a diffusor configured to diffuse radiation external to the pyranometer and passing through the dome, toward the receiving surface of thermopile-based sensor, wherein a distance of an optical path between the diffusor and the thermopile-based sensor is set such that the radiation diffused by the diffusor on the receiving surface of the thermopile-based sensor has a cone shape; and
   at least one optical filter arranged in an optical path of the radiation in front of the receiving surface of the thermopile-based sensor so as to modify the spectral composition of the radiation measured by the thermopile-based sensor.

2. The pyranometer according to claim 1, wherein the at least one optical filter at least partly compensates a spectral selectivity of the thermopile-based sensor, the diffusor, and the dome.

3. The pyranometer according to claim 1, wherein the at least one optical filter at least partly compensates a spectral selectivity of the thermopile-based sensor.

4. The pyranometer according to claim 1, wherein the at least one optical filter at least partly compensates a spectral selectivity of the diffusor.

5. The pyranometer according to claim 1, wherein the at least one optical filter at least partly compensates a spectral selectivity of the diffusor.

6. The pyranometer according to claim 1, wherein the at least one optical filter modifies the spectral composition of the radiation measured by the thermopile-based sensor such that spectral selectivity based on a spectral absorptance and a spectral transmittance of the thermopile-based sensor, and/or the diffusor, and/or of the dome has a maximum percentual deviation of about ±3% from a mean value in a wavelength range of the radiation spectrum ranging from about 350 nm to about 1500 nm.

7. The pyranometer according to claim 1, wherein the at least one optical filter modifies the spectral composition of the radiation measured by the thermopile-based sensor such that spectral selectivity based on a spectral absorptance and a spectral transmittance of the diffusor has a maximum percentual deviation of about ±3% from a mean value in a wavelength range of the radiation spectrum ranging from about 350 nm to about 1500 nm.

8. The pyranometer according to claim 1, wherein the at least one optical filter modifies the spectral composition of the radiation measured by the thermopile-based sensor such that spectral selectivity based on a spectral absorptance and a spectral transmittance of the dome has a maximum percentual deviation of about ±3% from a mean value in a wavelength range of the radiation spectrum ranging from about 350 nm to about 1500 nm.

9. The pyranometer according to claim 1, wherein the at least one optical filter is configured such that a transmittance of the at least one optical filter is greater for a spectrum wavelength lower than about 400 nm than the transmittance of the at least one optical filter for a spectrum wavelength greater than about 700 nm.

10. The pyranometer according to claim 1, wherein the at least one optical filter comprises one or more layers each being configured to have different refracting, transmission, absorption and/or reflection characteristics for a specified radiation wavelength value or range.

11. The pyranometer according to claim 1, wherein the at least one optical filter is arranged on the optical path between the diffusor and the receiving surface of the thermopile-based sensor.

12. The pyranometer according to claim 1, wherein the at least one optical filter is arranged to substantially face the receiving surface of the thermopile-based sensor, wherein the at least one optical filter is arranged to substantially face an active black coating surface of the thermopile-based sensor; and/or wherein the at least one optical filter is embedded in a material of the active black coating of the thermopile-based sensor.

13. The pyranometer according to claim 1, wherein the thermopile-based sensor is located in a housing, wherein the at least one optical filter is arranged to substantially cover a window of the housing.

14. The pyranometer according to claim 1, wherein the at least one optical filter is arranged to at least partially cover an external surface of the diffusor, and/or wherein the at least one solar optical filter is arranged on an inner part of the diffusor.

15. The pyranometer according to claim 1, wherein the at least one optical filter is arranged on the dome, and at least partially covers the inner surface and/or the outer surface of the dome.

16. The pyranometer according to claim 1, wherein the at least one optical filter comprises one or more vacuum deposited dielectric metal layers.

17. The pyranometer according to claim 1, wherein the at least one optical filter is a transmission interference filter.

18. The pyranometer according to claim 1, wherein the at least one optical filter is a reflection filter; or wherein the at least one optical filter is an absorption filter.

19. The pyranometer according to claim 1, further comprising at least one collimator configured to collimate the radiation impinging on the receiving surface of the thermopile-based sensor.

* * * * *